United States Patent

Hyland

[11] Patent Number: 6,024,593
[45] Date of Patent: Feb. 15, 2000

[54] ELECTRONIC MODULE CONNECTOR HAVING A LOCKING COVER

[75] Inventor: James Henry Hyland, Hummelstown, Pa.

[73] Assignee: The Whitaker Corporation, Wilmington, Del.

[21] Appl. No.: 09/116,139

[22] Filed: Jul. 15, 1998

Related U.S. Application Data

[63] Continuation-in-part of application No. 08/950,115, Oct. 14, 1997, abandoned.

[51] Int. Cl.[7] .................................................... H01R 13/62
[52] U.S. Cl. .......................... 439/326; 439/331; 235/441; 361/737
[58] Field of Search .................................. 439/142, 635, 439/326, 331; 235/441, 492, 479; 361/737, 736, 740, 801, 752

[56] References Cited

U.S. PATENT DOCUMENTS

| | | | |
|---|---|---|---|
| 3,864,172 | 2/1975 | Marks | 136/173 |
| 4,221,448 | 9/1980 | Logerot et al. | 439/260 |
| 4,721,348 | 1/1988 | Mouissie | 439/328 |
| 4,724,310 | 2/1988 | Shimamura et al. | 235/483 |
| 4,735,578 | 4/1988 | Reichardt et al. | 439/152 |
| 4,887,188 | 12/1989 | Yoshida et al. | 361/413 |
| 4,938,716 | 7/1990 | Chabrolle et al. | 439/635 |
| 4,961,710 | 10/1990 | Komatsu | 439/267 |
| 5,012,078 | 4/1991 | Pernet | 235/441 |
| 5,013,255 | 5/1991 | Juret et al. | 439/260 |
| 5,033,972 | 7/1991 | Komatsu et al. | 439/153 |
| 5,091,618 | 2/1992 | Takahashi | 235/441 |
| 5,155,659 | 10/1992 | Kunert | 361/380 |
| 5,259,777 | 11/1993 | Schuder et al. | 439/188 |
| 5,320,552 | 6/1994 | Reichardt et al. | 439/331 |
| 5,321,247 | 6/1994 | Mroczkowski et al. | 235/68 |
| 5,330,363 | 7/1994 | Gardner et al. | 439/188 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,463,210 | 10/1995 | Imura | 235/441 |
| 5,574,625 | 11/1996 | Ohgami et al. | 361/684 |
| 5,603,629 | 2/1997 | DeFrasne et al. | 439/326 |
| 5,667,397 | 9/1997 | Broschard, III et al. | 439/188 |
| 5,813,878 | 9/1998 | Kuwata et al. | 439/326 |

FOREIGN PATENT DOCUMENTS

| | | | |
|---|---|---|---|
| 0 493 473 B1 | 9/1990 | European Pat. Off. | G05K 7/06 |
| 0 520 080 A1 | 12/1992 | European Pat. Off. | H05K 13/02 |

OTHER PUBLICATIONS

International Search Report, PCT/US97/18583, Dated Jan. 19, 1989, pp. 1&2.

Abstract and drawings for File No. 16693, Serial No. 08/935,553 filed Sep. 23, 1997 based on Provisional Application Serial No. 60/027,268 filed Sep. 26, 1996.

*Primary Examiner*—Khiem Nguyen
*Assistant Examiner*—T C Patel

[57] ABSTRACT

An electrical connector (10) is provided for receiving an electronic module (60), the connector (10) having an insulative base (20) which is mountable to a printed circuit board and supports electrical contacts (26) which are also connected to the printed circuit board. A cover (30) is provided for receiving the electronic module (60) and is rotatably mounted to the base (20) and securably thereto by the cooperation of a locking disc (40) with locking projections (21) extending from sidewalls of the base (20).

17 Claims, 5 Drawing Sheets

ELECTRONIC MODULE CONNECTOR HAVING A LOCKING COVER

This application is a cip of Ser. No. 08/950,115 filed Oct. 14, 1997 now abandoned.

FIELD OF THE INVENTION

This invention is directed to an electrical connector and more particularly to an electrical connector for receiving electronic module.

BACKGROUND OF THE INVENTION

Electronic modules such as subscriber identification modules (SIMs) are well known in the communications industry. They are small electronic smart cards, approximately 25×15 mm, which contain information to specifically identify a subscriber, for example a telephone subscriber. The modules are read by electronic devices such as telephones and allow a particular user to access the device.

Electrical connectors have been provided in the electronic devices for reading these electronic modules. One example of such a connector is disclosed in U.S. Pat. No. 5,320,552 by Reichardt et al. This patent teaches a contacting apparatus 2 having a housing 3 which supports a series of electrical contacts 8 and a receiving slot 7 for a SIM. Abutment means are also provided on the support arm 4 which is adapted to hold the SIM 1 in the housing 3. The support arm 4 is best shown in FIG. 1 and is depressed as the SIM 1 is inserted into the housing 3. The support arm 4 returns back to its relaxed position once the SIM 1 is fully inserted into the housing 3 and captivated in the support arm 4 by engagement with the engagement surface 21.

In an alternate embodiment, Reichardt et al. teaches a cover 34 for receiving the SIM 1 which is hingeably mounted to a housing 33 which supports the electrical contacts 8. The hingeably mounted cover 34 may be rotated into an initial closed position and then linearly moved relative to the SIM 1 to a locked position where it is held by a recess 40.

These connectors present several problems. For example, in the first embodiment, the support arm does not serve to reliably secure a SIM 1 into the housing. The SIM 1 can unintentionally be removed from the housing 3 by inadvertent depression of the support arm 4. Also, with both of these embodiments, there is a translating motion between the contact pads on the SIM and the electrical contacts of the housing causing a wiping action over the pads of the SIM. Since SIMs are intended to have a high mating and unmating cycle life, excessive wiping action tends to prematurely wear the contact pads.

One approach to solving these problems is presented by the CCM Smart Card Connector Part No. CCM03 by ITT Canon. This connector features a rotatable cover which receives the SIM. The cover has a slide bar associated therewith having tabs extending from its edges for locking the cover to the base by sliding the bar along the top of the cover. Since the locking motion is in the same direction as the card-mating motion, a similar problem of inadvertent sliding of the locking bar could occur.

SUMMARY OF THE INVENTION

It is therefore an object of this invention to provide an electrical connector that will securely and reliably hold an electronic module such as a SIM therein. It is a further object of this invention to provide a module connector which does not prematurely wear the contact pads on the electronic module while providing reliable electrical connection during repeated cycles of mating and unmating. It is another object of the invention to provide an electrical connector that will securely and reliably hold a plurality of electronic modules.

The objects of the invention have been achieved by providing an electrical connector for receiving an electronic module such as a SIM having an insulative base which is mountable to a printed circuit board and supports electrical contacts which are also connected to the printed circuit board. A cover for receiving the electronic module is rotatably mounted to the base and securable thereto by the cooperation of a locking disc mechanism with locking projections extending from sidewalls of the base. The objects are further achieved by providing a base and cover that can accommodate a plurality of modules, the cover being securable to the base by at least one locking disc mechanism.

The invention will be described by way of examples with reference to the accompanying drawings.

BRIEF DESCRIPTION OF THE DRAWINGS

The invention will now be described by way of example with reference to the accompanying figures of which.

DETAILED DESCRIPTION OF EMBODIMENTS OF THE INVENTION

Figure 1:
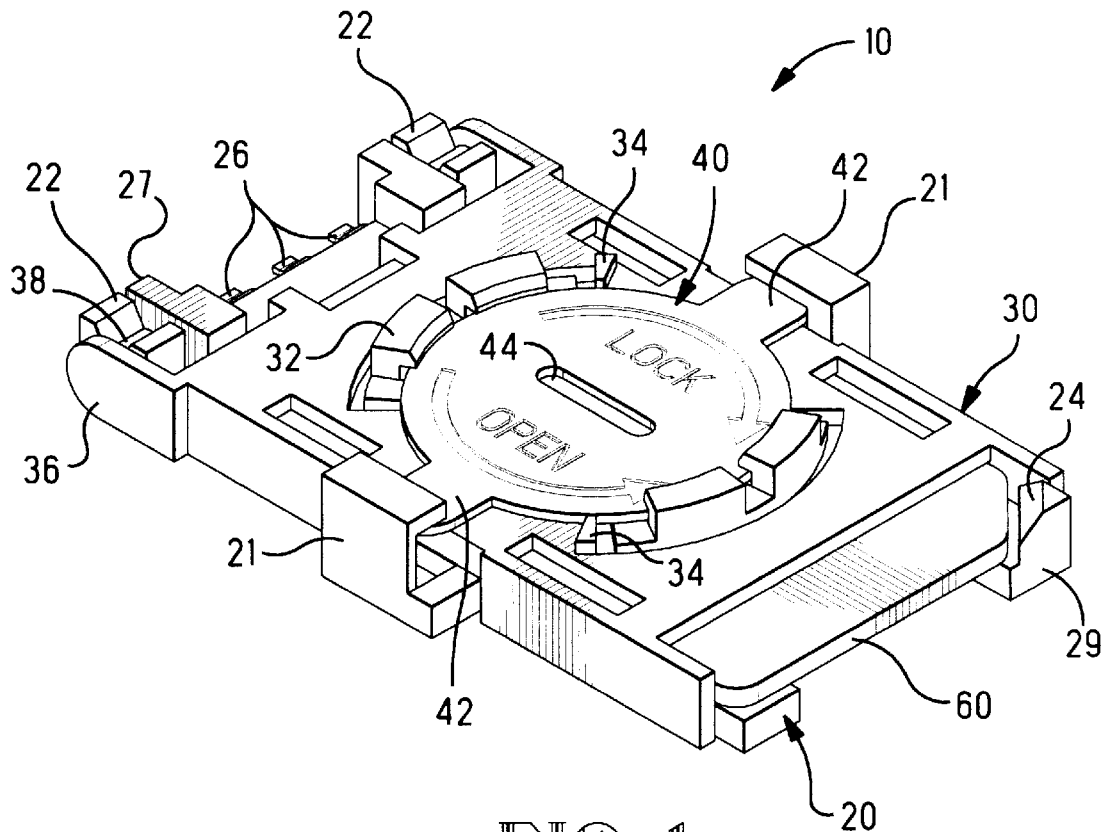
FIG. 1 shows a three-dimensional view of the electronic module connector according to this invention.

The invention will first be described generally with reference to FIG. 1 which shows the electronic module connector 10 according to this invention. The connector 10 consists of a base 20 having a pair of cover receiving channels 22 disposed at a pivot end 27. Contacts 26 extend from the base 20 for surface mounting to a printed board circuit (not shown). A polarizing projection 24 is disposed at the card-receiving end 29 of the base 20. Locking projections 21 extend from the sides of the base 20 towards a cover 30 which is hingeably mounted to the base 20 at the pivot end 27. The cover 30 features mounting arms 36 having cylindrical projections 38 extending from the mounting arms 36 for hingeable engagement with the cover receiving channels 22 of the base 20. A slot 35 (FIG. 2) is formed in the cover 30 for slidably receiving an electronic module 60 from the mating end 29. Disc securing projections 32 extend from a top surface 39b of the cover 30 to form a disc-receiving area 33 and stop projections 34 are provided along the disc-receiving area 33 for limiting rotation of a locking disc 40. A Slot 37 is formed around the disk receiving area 33 between the securing projections 32 and the top surface 39b. The locking disc 40 is captured by the disc projections 32 of the cover in the disc receiving area 33. The locking disc 40 is rotatable between an open position and a locked position in order to release or lock the cover 30 from the base 20.

Figure 2:
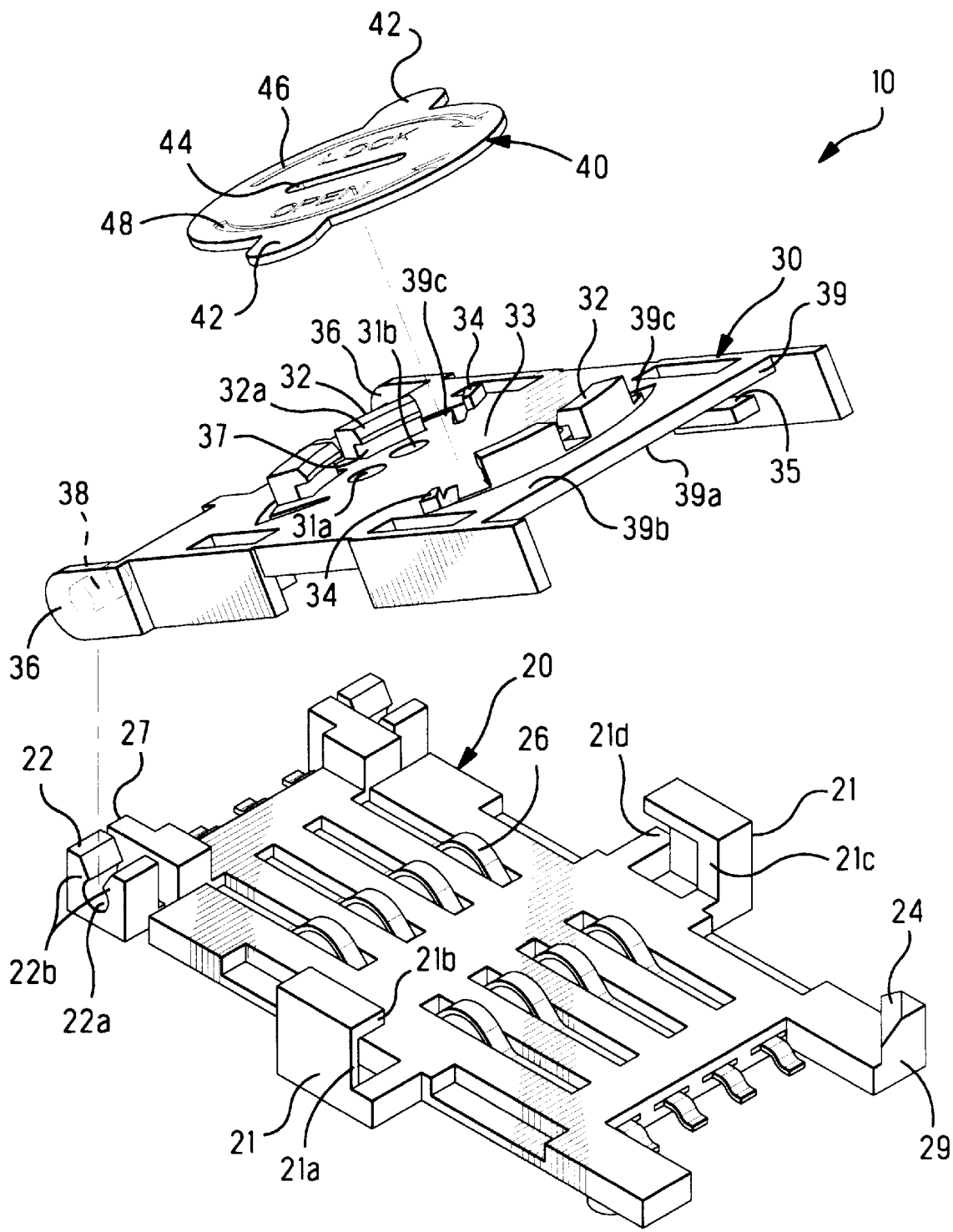
FIG. 2 shows an exploded three-dimensional view of the major components of the electronic module connector according to this invention.

Each of the major components will now be described in greater detail with reference to FIG. 2. The base 20 is profiled to be mounted to a printed circuit board and has surface mount contacts 26 mounted therein by well known techniques. A polarizing projection 24 is provided at a card mating end 29 for cooperation with a cutaway portion 62 of the SIM 60. Locking projections 21 extend from the sides of the base 20. Each of the locking projections 21 consists of a side wall 21a, a top wall 21b extending from the side wall 21a and a stop wall 21c extending from both the top wall 21b and the side wall 21a to form a channel 21d therebetween. Cover receiving channels 22 are provided at the pivot end 27, each being profiled to have a semi-cylindrical section 22a and pair of cantilever arms 22b extending along the open end of the semi-cylindrical section 22a.

The cover 30 is provided with mounting arms 36 extending from a cover body 39 towards the pivot end 27. Cylindrical projections 38, shown in phantom in FIG. 2, extend inward toward each other from each of the mounting arms 36. Disc securing projections 32 extend from a deflectable portion 39c of the cover body 39 along the top surface 39b to form a semi-circular slot 37 about a disc-receiving area 33. The disc securing projections 32 are profiled to have camming surfaces 32a which cooperate with a locking disc 40 to urge the disc securing projections 32 and the deflectable portions 39c outward during assembly which will be described in greater detail below. Stop projections 34 extend from the top surface 39b and are disposed at selected positions adjacent to the disc securing projections 32 on the deflectable portion 39c. A pair of open position detents 31a (FIG. 5) are disposed on the top surface 39b inside the disc receiving area 33 adjacent to the disc securing projections 32. Likewise, a pair of closed position detents 31b are provided on the top surface 39b inside the disc receiving area circumferentially spaced from the pair of open position detents 31a. A card-receiving slot 35 is formed on the underside 39a of the cover body 39 for slidably receiving a SIM 60 therein.

Figure 5:
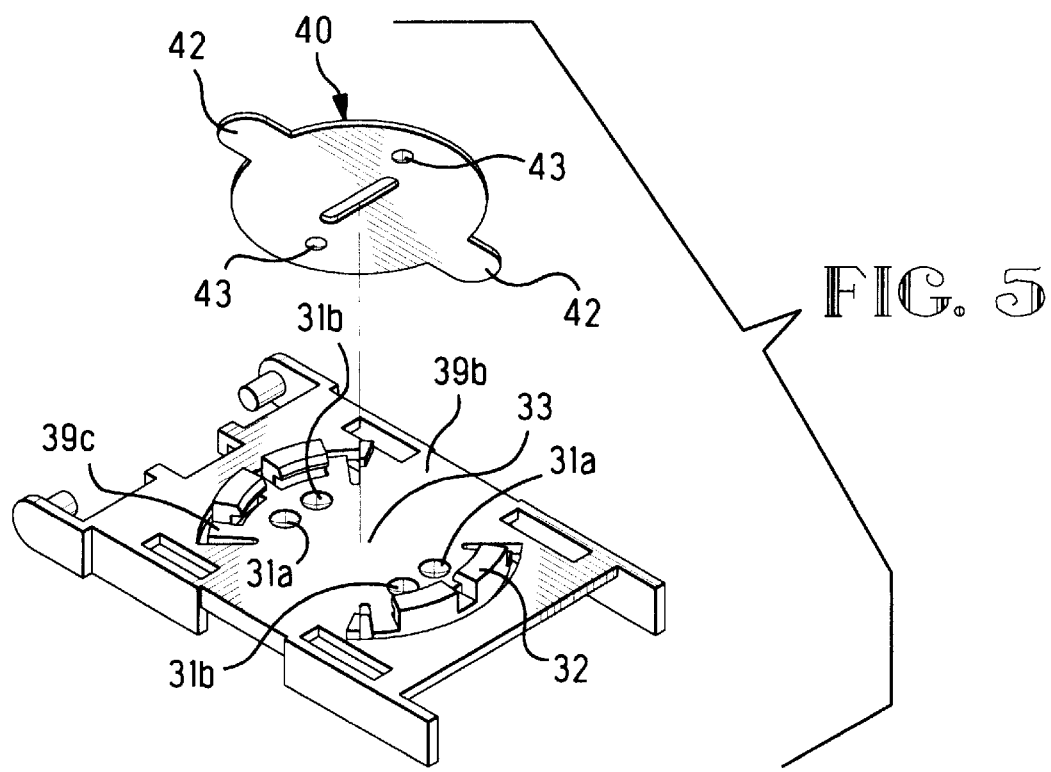
FIG. 5 shows an exploded isometric view of the cover and the underside of the locking disc.

Finally, a locking disc 40 is mountable to the cover 30 and features tabs 42 extending from edges thereof. The locking disc 40 is formed from a thin sheet of material and is generally circular along its major surfaces. A slot 44 is formed in the center of the disc 40 to assist in rotation using a tool such as a screwdriver. A locking arrow 46 is provided along the major visual surface of the disc 40 to indicate the direction of rotation necessary in order to lock the cover 30, to the base 20. Likewise, an open arrow 48 is provided to indicate the direction of rotation necessary in order to release the cover 30 from the base 20. As shown in FIG. 5, the underside of the locking disc 40 is profiled to have a pair of embossments 43 for cooperation with the open position detents 31a and the closed position detents 31b on the cover top surface 39b.

Assembly of the major components will now be described in greater detail referring once again to FIG. 2. First, the locking disc 40 is simply snapped into the disc securing projections 32 of the cover. Since the disc securing projections 32 extend from a deflectable portion 39c of the cover body 39 and feature camming surfaces 32a, they will tend to resile outward in order to receive the locking disc 40 and will return to a relaxed secured position after the locking disc 40 passes over the camming surfaces 32a. The disc is initially received in the disc receiving area 33 and rotatably secured into the slot 37 such that the tabs 42 are facing opposite sides of the cover 30 and lie between stop projections 34. The cover 30 is then mounted to the base 20 by simply pressing the cylindrical projections 38 into the cover receiving channels 22 The disc 40 is now rotatably mounted to the cover 30, and the cover 30 is hingeably mounted to the base 20. This completes the final assembly of the connector 10.

Figure 3:
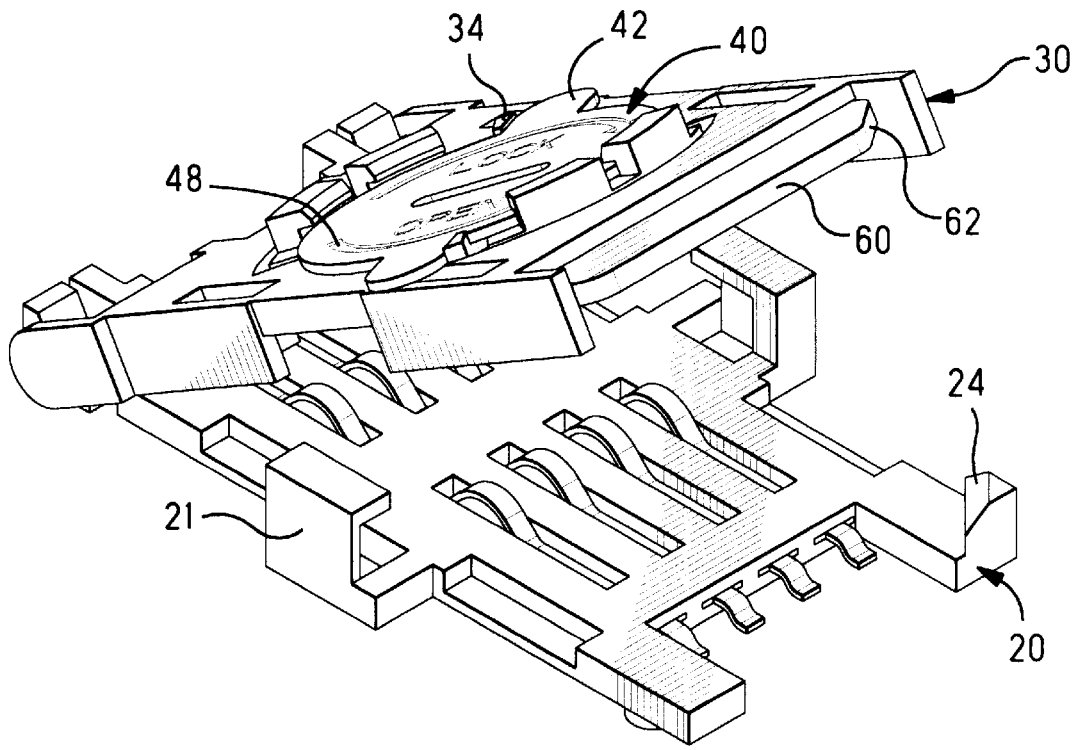
FIG. 3 shows an isometric view of the electronic module connector having a SIM inserted and the cover in the open position.
Figure 4:
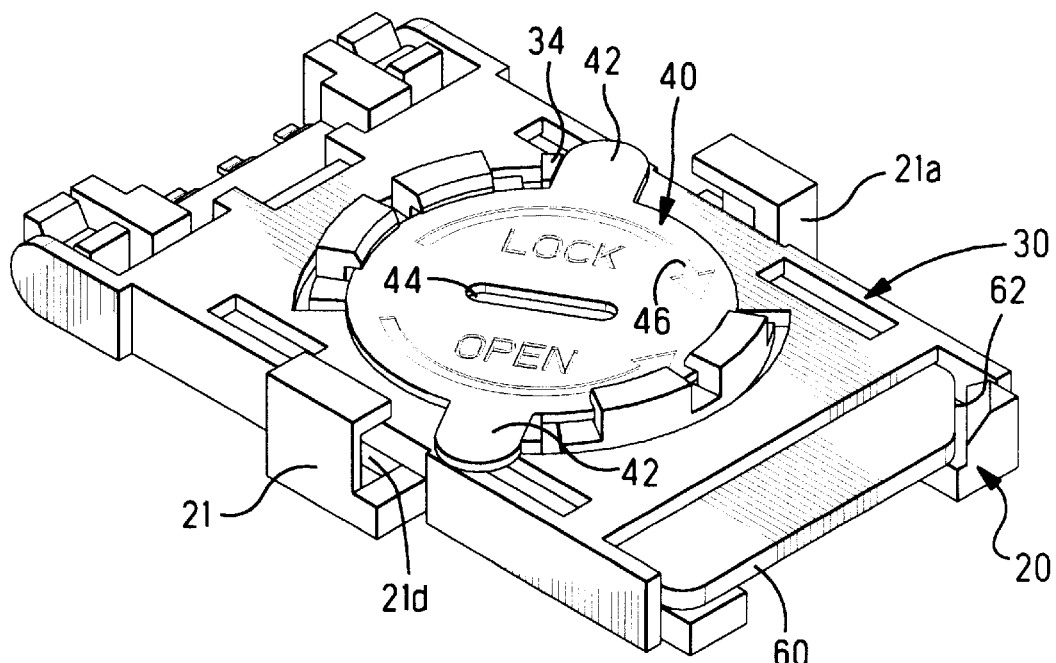
FIG. 4 shows an isometric view of the electronic module connector having an electronic module inserted therein and the cover rotated into the closed position prior to locking.

Operation of the electrical connector will now be described with reference to FIGS. 3 and 4. As shown in FIG. 3, an electronic module 60 is inserted into the slot 35 (FIG. 2) of the cover 30 such that the cutaway portion 62 will be aligned to cooperate with the polarizing projection 24 of the base 20. The locking disc 40 is rotated counter clockwise as indicated by the open arrow 48 to an open position whereby tabs 42 engage the stop projections 34 of the cover 30 and the embossments 43 engage the open position detents 31a (FIG. 5). The cover 30 is then rotated downward toward the base 20 to the position shown in FIG. 4. The cover 30 being in the closed position over the base 20 may then be locked by simply rotating the locking disc 40 clockwise as indicated by the locking arrow 46 such that tabs 42 are urged into the channel 21d until they abut against the stop wall 21c of the locking projection 21 (FIG. 1) and the embossments 43 engage the closed position detents 31b (FIG. 5). Slot 44 is provided for insertion of a screw driver or similar tool to assist in rotating the locking disc 40. Alternatively, the locking disc 40 may be provided with a rough surface so that a simple depression and rotating action using a fingertip will suffice to lock the disc into its final position as shown in FIG. 1.

Figure 6:
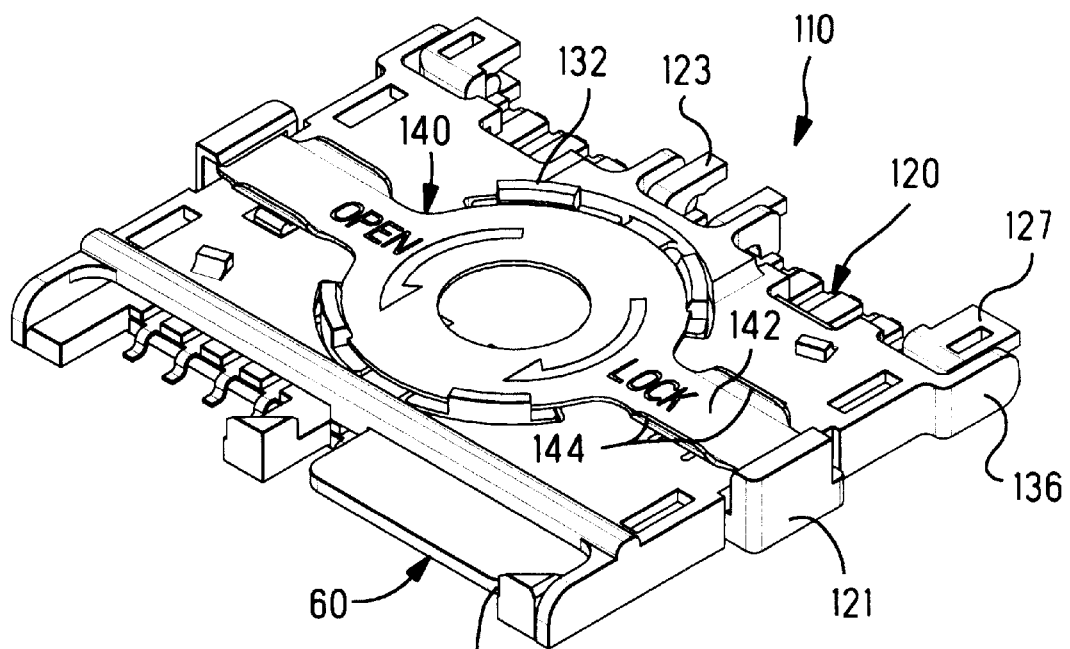
FIG. 6 shows an isometric view of an alternate embodiment of the electronic module connector of the present invention and having a card positioned in one of the card receiving slot.
Figure 8:
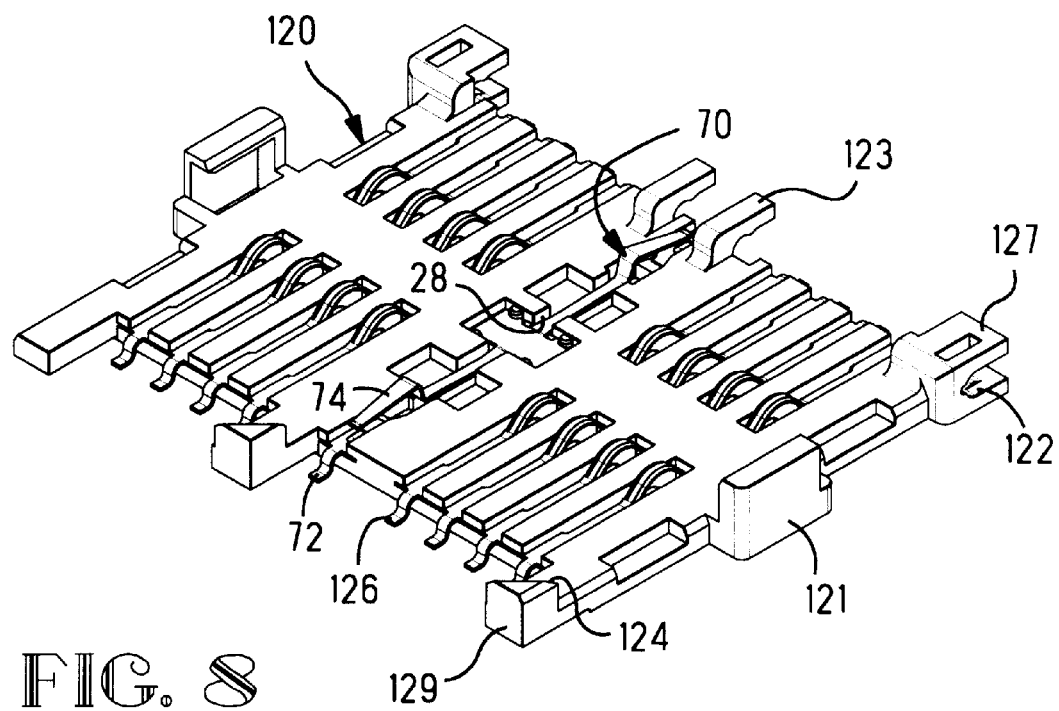
FIG. 8 shows an isometric view of the base of the connector of FIG. 6.
Figure 7:
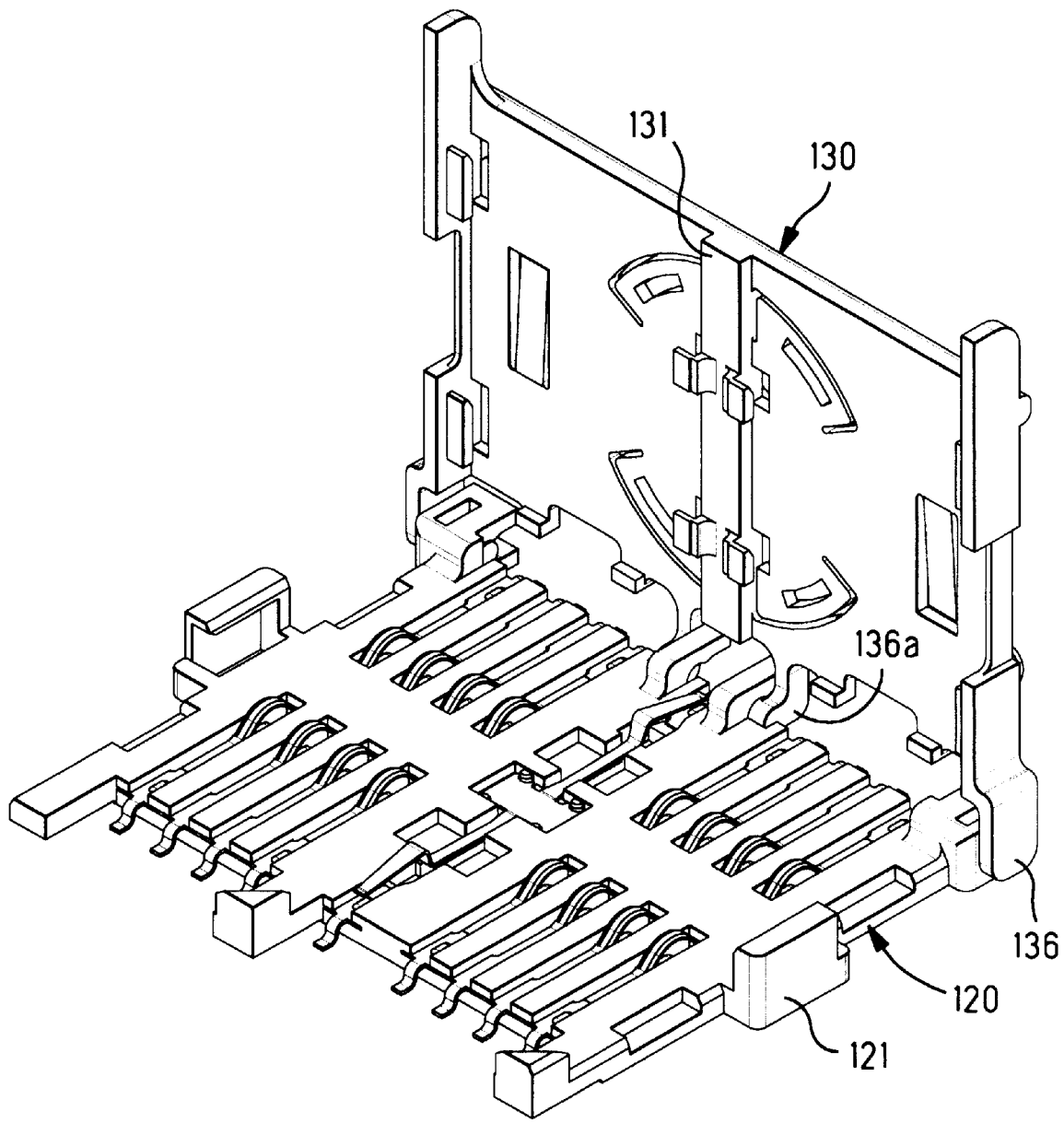
FIG. 7 shows an isometric view of the connector of FIG. 6 with the cover opened and the card removed.

Referring now to FIGS. 6 through 8, electronic module connector embodiment 110 includes a base 120 and a cover 130 hingedly mounted thereto and secured with locking disc 140. Base 120 has a pair of cover receiving channels 122 disposed at the pivot end 127 adapted to receive projections (not shown) of cover mounting arms 136 in a similar manner as previously described.

Base 120 includes two arrays of contacts 126, each array being configured to mate with corresponding circuit pads (not shown) of an electronic module 60. In the embodiment shown, the two arrays are spaced from each other by an end position switch 70, which extends from the card receiving end 129 to the pivot end 127. The pivot end of the base also includes a pair of outwardly extending projections 123 that cooperate with corresponding positioning arms 136a to assure the cover 130 and base 120 are held in alignment. It is to be recognized other arrangements may also be used to align and hold the cover 130 in position along the pivot edge 127. The sides of base 120 include locking projections 121 similar to those previously described. The card receiving edge includes a polarizing projection 124 for each card receiving position. Connector 110 is shown with an electronic module received in one of the two positions.

Cover 130 includes substantially the same features as cover 30. To assure the cover is properly positioned on the base, the cover includes positioning arms 136a and along the pivot edge. Additionally the underside of cover 130 includes a center rib 131 extending between the card receiving edge and the pivot edge. This rib 131 is aligned with switch 70 and provides force against the upper contact 74 when the cover is locked into position on base.

Locking disc 140 includes outwardly directed tabs 142. The arms 142 are of sufficient length to have the leading ends thereof engageable in the locking projections 121 of the base 120. Locking tabs may further include upwardly directed finger engaging projections 144 along the sides thereof, which may be used to move the locking disc between the open and locked positions. Locking disc 140 is mounted to the cover 130 by snapping the disc 140 into disc securing projections 132.

Switch 74 includes a pair of discrete lower contacts 72, one mounted proximate the card receiving end and the other mounted proximate the pivot end. An elongated movable contact 74 extends along contact passageway 128 in base 120. When the cover 130 is secured to the base 120, the contact surfaces of movable contact 74 are urged downwardly by the cover and are brought into electrical engagement with the corresponding lower contacts 72. This action sends an electrical signal that indicates that the card or cards are in position and the system is ready to operate.

One advantage of this invention is that it provides a reliable electrical connection to an electronic module 60 without prematurely wearing the pads of the electronic module 60. An additional advantage is that a simple mechanism is provided for easy insertion of the electronic module into the connector and easy securing of the electronic module therein. Another advantage is that the cover 30 can be lifted from the base 20 by grasping either the mating end or the sides. An advantage of the multiple module connector is that it requires less space on the circuit board than is required for mounting a corresponding number of single module connectors.

It is thought that the electronic module connector of the present invention and many of its attendant advantages will be understood from the foregoing description. It is apparent that various changes may be made in the form, construction, and arrangement of parts thereof without departing from the spirit or scope of the invention, or sacrificing all of its material advantages.

I claim:

1. An electrical connector for receiving a planar electronic card comprising:
   an insulative base having a pivot end and a pair of side walls extending from the pivot end, the insulative base being mountable to a printed circuit board and having electrical contacts therein for connection to the printed circuit board, and;
   a cover for receiving a planar electronic card, the cover being rotatably mounted to the base at the pivot end and securable thereto by cooperation of a locking disc mechanism disposed on a major surface of the cover with at least one locking projection extending from at least one of the side walls of the insulative base.

2. The electrical connector according to claim 1 wherein the locking disc mechanism comprises a disc body having at least one tab extending from an edge thereof.

3. The electrical connector according to claim 2 wherein the disc body is rotatably secured in a disc receiving area disposed along a top surface of a cover body by opposed disc locking projections extending from a deflectable portion of the cover body whereby the disc is rotatable on the cover body in a plane that is substantially parallel to the electronic card received by the cover.

4. The electrical connector according to claim 3 wherein the disc locking projections are profiled to have camming surfaces at a disc receiving edge whereby the respective opposed locking projections and the deflectable portions are urged apart as the locking disc is urged into the disc receiving area.

5. The electrical connector according to claim 4 wherein the base further comprises at least one locking projection extending from one of the side walls for receiving the at least one tab of the disc body.

6. The electrical connector according to claim 5 wherein the at least one locking projection consists of a side wall, a top wall extending from the side wall and a stop wall extending from both the top wall and side wall to form a tab receiving channel.

7. The electrical connector according to claim 6 wherein the disc body is rotatably securable to the base by engagement of the tab with the top wall of the locking projection and simultaneous engagement of at least one embossment disposed on the underside of the locking disk with at least one closed position detent disposed on the top surface of the cover body.

8. The electrical connector according to claim 3 wherein the locking disc is securable in an open position on the cover body by the engagement of the at least one embossment disposed on the underside of the locking disk with at least one open position detent disposed on the top surface of the cover body.

9. An electrical connector having a base and a cover for receiving a planar electronic card, the cover being rotatably attached to the base and securable thereto, the connector being characterized by:
   a locking disc mechanism disposed along a major surface of the cover having a disc body rotatably secured to the cover such that it is rotatable in a plane which is substantially parallel to the electronic card, the disc body having at least one tab extending from an edge thereof for rotatably engaging a locking projection extending from the base toward the cover.

10. An electrical connector for receiving a plurality of planar electronic cards comprising:
    an insulative base having a pivot and a pair of side walls extending from the pivot end, the insulative base being mountable to a printed circuit board and having electrical contacts therein for connection to the printed circuit board, and;
    a cover for receiving a plurality of planar electronic cards, the cover being rotatably mounted to the base at the pivot end and securable thereto by cooperation of a locking disc mechanism disposed on a major surface of the cover with at least one locking projection extending from at least one of the side walls of the insulative base.

11. The electrical connector according to claim 10 wherein the locking disc mechanism comprises a disc body having at least one tab extending from an edge thereof.

12. The electrical connector according to claim 11 wherein the disc body is rotatably secured in a disc receiving area disposed along a top surface of a cover body by opposed disc locking projections extending from a deflectable portion of the cover body whereby the disc is rotatable on the cover body in a plane that is substantially parallel to the electronic card received by the cover.

13. The electrical connector according to claim 12 wherein the disc locking projections are profiled to have camming surfaces at a disc receiving edge whereby the respective opposed locking projections and the deflectable portions are urged apart as the locking disc is urged into the disc receiving area.

14. The electrical connector according to claim 13 wherein the base further comprises at least one locking projection extending from one of the side walls for receiving the at least one tab of the disc body.

15. The electrical connector according to claim 14 wherein the at least one locking projection consists of a side wall, a top wall extending from the side wall and a stop wall extending from both the top wall and side wall to form a tab receiving channel.

16. The electrical connector according to claim 15 wherein the disc body is rotatably securable to the base by engagement of the tab with the top wall of the locking projection and simultaneous engagement of at least one embossment disposed on the underside of the locking disk with at least one closed position detent disposed on the top surface of the cover body.

17. The electrical connector according to claim 12 wherein the locking disc is securable in an open position on the cover body by the engagement of the at least one embossment disposed on the underside of the locking disk with at least one open position detent disposed on the top surface of the cover body.

* * * * *